United States Patent

[11] 3,618,118

[72] Inventor William A. Lloyd
San Jose, Calif.
[21] Appl. No. 845,359
[22] Filed July 28, 1969
[45] Patented Nov. 2, 1971
[73] Assignee Varian Associates
Palo Alto, Calif.

[54] ELECTROGRAPHIC WRITING HEAD OF PLURAL PRINTED CIRCUIT CONSTRUCTION

3 Claims, 6 Drawing Figs.

[52] U.S. Cl. 346/74 ES, 317/101 B, 317/101 D, 317/101 F, 346/74 E
[51] Int. Cl. G01d 15/06, H05k 1/14, H05k 3/20
[50] Field of Search 346/74 ES; 101/DIG. 13; 317/101 B, 101 D, 101 F

[56] References Cited

UNITED STATES PATENTS

| | | | |
|---|---|---|---|
| 2,892,131 | 6/1959 | MacDonnell | 317/101 F |
| 3,071,685 | 1/1963 | Joyce | 346/74 ES X |
| 3,113,248 | 12/1963 | Friedman | 317/101 D |
| 3,267,485 | 8/1966 | Howell | 346/74 ES X |

*Primary Examiner*—Bernard Konick
*Assistant Examiner*—Howard W. Britton
*Attorney*—Leon F. Herbert

ABSTRACT: An electrographic writing head is disclosed which employs a plurality of elongated flexible printed circuit boards each supporting thereon a portion of an array of closely spaced electrographic styli. Each circuit board is tapered from a wide end to a relatively narrow end. The narrow ends of the boards are arranged in side-by-side coplanar relation to define the exposed styli electrodes, whereas the wide ends of the boards contain the terminals for connecting to electrical connector assemblies, such wide ends being arranged in noncoplanar overlapping relation to accommodate connector assemblies.

INVENTOR
WILLIAM A. LLOYD

BY Leon F. Herbert
ATTORNEY

INVENTOR.
WILLIAM A. LLOYD
BY Leon F. Herbert
ATTORNEY

ELECTROGRAPHIC WRITING HEAD OF PLURAL PRINTED CIRCUIT CONSTRUCTION

DESCRIPTION OF THE PRIOR ART

Heretofore, a printed circuit board has been employed to support an array of electrographic styli electrodes formed thereon. Terminal connections were made at one end of the board and the styli were exposed at the other end of the board for depositing charge on a charge retentive surface of a recording medium. Such an arrangement has proven feasible for styli electrodes having center-to-center spacing of 0.050 inch with 25 electrodes to the linear inch of the array. At the terminal end of the board, alternate electrodes were connected to terminals on opposite sides of the board through plated holes in the board such that the terminal contact spacing on each side of the board was 0.100 inch or twice the styli spacing. However, when an attempt is made to employ this prior arrangement for styli arrays having 100 styli to the linear inch the requisite terminal spacing for mating to standard connector assemblies cannot be obtained.

SUMMARY OF THE PRESENT INVENTION

The principal object of the present invention is the provision of an improved electrographic writing head.

One feature of the present invention is the provision, in an electrographic writing head, of an array of styli electrodes supported by a plurality of elongated sheetlike insulative supportive members, each supportive member being tapered in width from a wide terminal-connecting portion to a narrow writing portion with the narrow writing portions being arranged in coplanar side-by-side relation and the wide connecting portions being arranged in a noncoplanar overlapping relation to facilitate connection to connector assemblies.

Another feature of the present invention is the same as the preceding feature wherein the insulative supportive members are flexible printed circuit boards.

Another feature of the present invention is the same as any one or more of the preceding features wherein the insulative supporting members are bifurcated from the wide portion toward the narrow portion to accommodate misalignment of the connector assemblies.

Other features and advantages of the present invention will become apparent upon a perusal of the following specification taken in connection with the accompanying drawings wherein:

DESCRIPTION OF THE PREFERRED EMBODIMENTS

Figures 1, 3, 4:
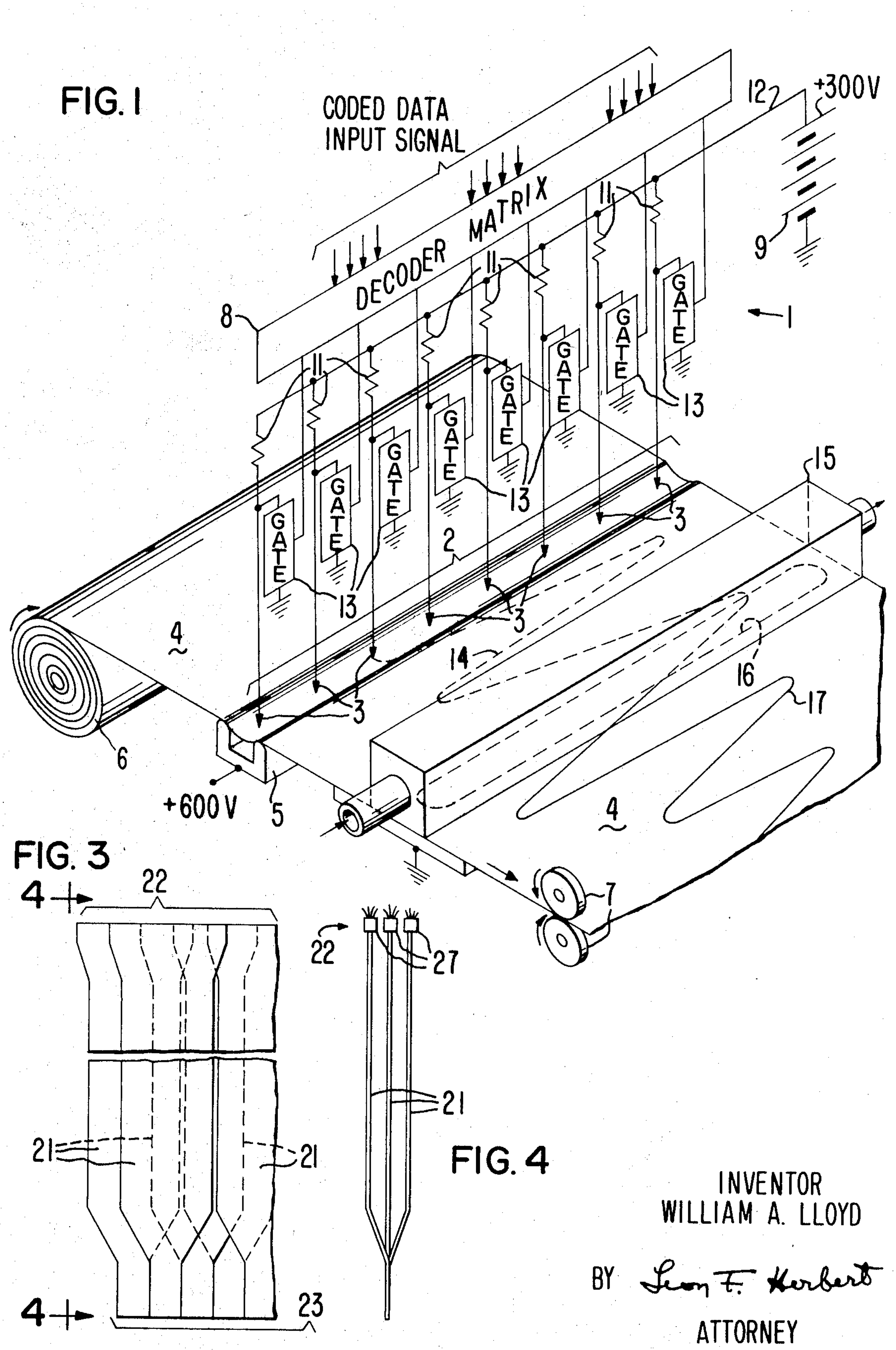
FIG. 1 is a schematic perspective line diagram, partially in block diagram form, of an electrographic writing apparatus incorporating features of the present invention.
FIG. 3 is a plan view of a plurality of the circuit boards of FIG. 2 as arranged to form the array of FIG. 1.
FIG. 4 is view of the structure of FIG. 3 modified to include connector assemblies and taken along line 4—4 in the direction of the arrows.

Referring now to FIG. 1, there is shown an electrographic writing apparatus 1 incorporating features of the present invention. The apparatus 1 includes an array 2 of electrographic styli 3 arranged crosswise of an electrographic recording medium 4, such as electrographic recording paper having a dielectric film supported on a conductive paper backing, which is drawn between the array 2 and a channel-shaped backup electrode 5 from a supply roll 6 by a pair of drive wheels 7 with the dielectric film disposed facing the styli.

The styli 3 are selectively energized with writing potential in response to a coded data input signal, typically binary coded data, which is fed to a decoder matrix 8 for decoding the input signal and energizing corresponding ones of the electrographic styli 3. More particularly, each of the styli 3 is connected to a source of constant positive potential 9, such as +300 $v$ via load resistors 11 and a common bar 12. Each stylus 3 is shunted to ground potential via a normally closed nonconducting gate 13 such that, in the nonwriting condition, +300 $v$ is applied to the backup electrode 5 such that, in the nonwriting condition, 300 $v$ appears across the recording paper 4. 300 $v$ is insufficient voltage to break down the air gap between the charge retentive surface of the paper 4 and the styli 3 for transfer of charge to the charge retentive surface.

To produce writing, an output of the decoder matrix 8 opens (renders conducting) a selected one of the gates 13 causing the potential on the corresponding stylus 3 to drop from +300 $v$ to ground potential, thereby producing a voltage drop of 600 $v$ across the air gap between the selected stylus 3 and the charge retentive surface of the paper 4. This is a sufficient voltage across the paper and gap to break down the airgap and transfer charge to the charge retentive surface of the paper.

Sequential energization of the styli 3 in response to coded input signal produces a negative charge image 14 on the recording medium 4. Charged toner particles, such as positively charged carbon particles suspended colloidally in a dielectric vehicle, are applied to the charge image 14 via an inking channel 15 having a slot 16 in the wall facing the image 14. Toner is fed continuously through the inking channel 15 from a source, not shown, at subatmospheric pressure such that the paper 4 is sucked toward slot 16 and seals the marginal edges of the inking slot 16. The positive toner particles are attracted to and held to the negative charge image 14, thereby developing same forming visible image 17.

In a typical example of the electrographic writing apparatus 1, the array 2 includes 100 styli to the linear inch, taken in the direction crosswise of the recording medium, with each stylus 3 having a width in the crosswise direction of 0.005 inch and being spaced from the adjacent styli by 0.005 inch. The array 2 can have a length of a few inches to more than 10 inches.

Figure 2:
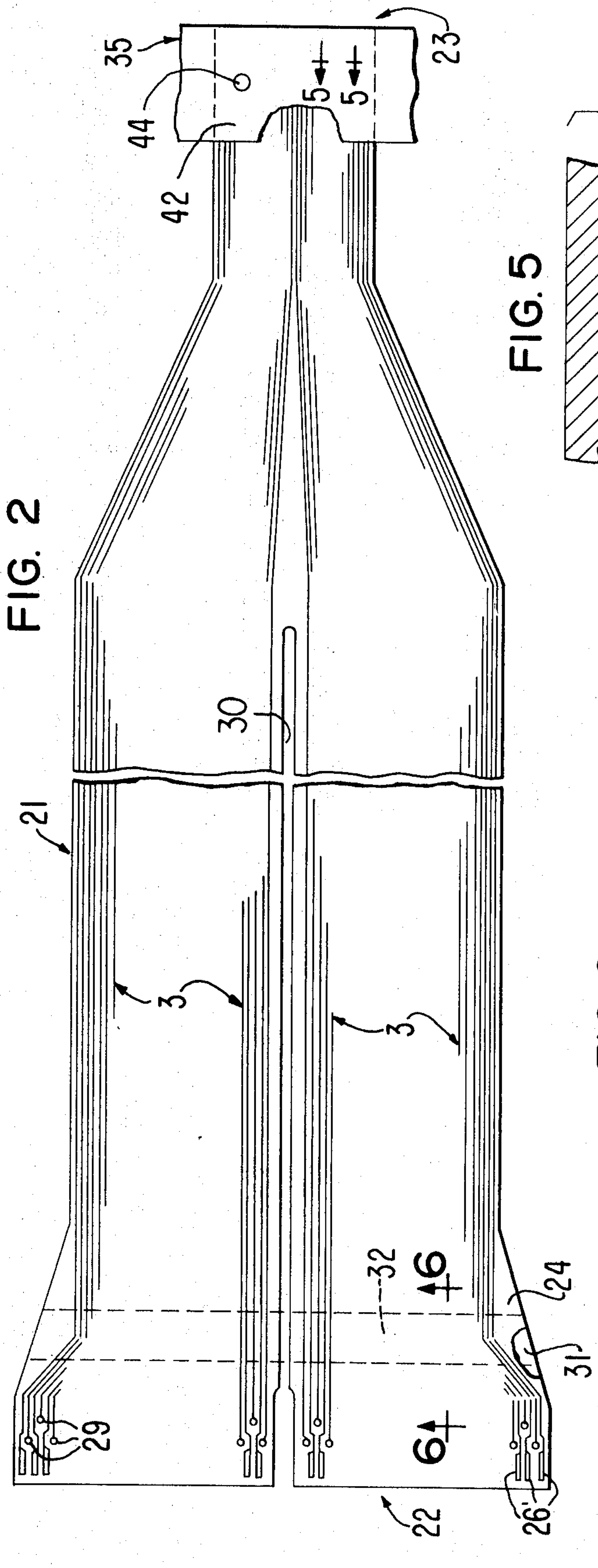
FIG. 2 is an enlarged plan view of one of the printed circuit boards making up a portion of the array of electrographic styli of FIG. 1.

Referring now to FIGS. 2–4, the construction of the array 2 of styli 3 will be described in greater detail. The array 2 is composed of a plurality of elongated sheetlike flexible printed circuit boards 21. Each printed circuit board has formed thereon, by conventional printed circuit techniques, an array of elongated conductive electrodes, as of copper, forming the writing styli 3. Each printed circuit board 21 is tapered in width from a relatively wide portion, as of 5.4 inches, near the connector end 22 to a relatively narrow portion, as of 1.6 inches near the other or writing end 23. In a typical example of the printed circuit board 21, the board includes a flexible fiberglass insulative substrate member 24, as of 0.010 inch thick and 25 " long, having a copper layer 25, as of 0.0015 inch thick, adhered to one face thereof, such layer 25 being photoetched in a certain pattern, as shown in FIG. 2, to define the array 2 of styli 3 extending lengthwise of the elongated board 21 from the wide connector end 22 to the narrow writing end 23.

The boards 21 are arranged in side-by-side relation at their narrow ends 23 in a coplanar array (see FIGS. 3 and 4), whereas the wide ends 22 are arranged in a noncoplanar array in overlapping relation to accommodate connection of the electrical terminals 26 to standard size female connector assemblies 27 by being plugged into such connectors 27. The flexibility of the circuit boards 21 facilitates fanning out of the circuit boards at their connector ends 22 to make such connections.

Each of the circuit boards 21 includes a centrally disposed longitudinally directed bifurcating slot 30, as of 0.125 inch wide, extending from the connector end 22, of the board toward the narrow end 23 of the board 21 over a preponderance of the length of the board 21 to provide additional flexibility in the bifurcated board 21 to accommodate misalignment of adjacent connectors 27 which are mounted in pairs.

Figure 6:
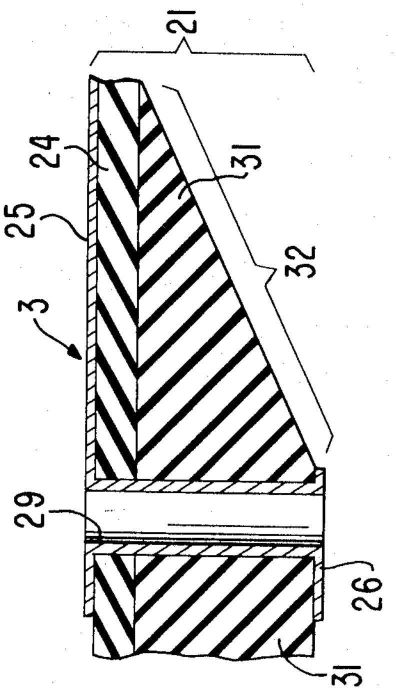
FIG. 6 is an enlarged view of a portion of the structure of FIG. 2 taken along line 6—6 in the direction of the arrows.

As in the prior art, alternate styli 3 are connected to a set of conductive gold-plated terminal pads 26, formed on the back side of the circuit board 21, via plated through holes 29 (see FIG. 6). The connector ends 23 of the boards 21 are stiffened by reinforcing plates 31, as of 0.060-inch-thick fiberglass, extending across each hair of the board 21 and bonded by epoxy adhesive to the insulative side of the substrate 24. The reinforcing plates 31 are tapered in thickness, at 32, down to the substrate member 24. Alternate styli 3 on the front side of the circuit board 21 are connected to gold-plated copper terminal pads 26'.

Figure 5:
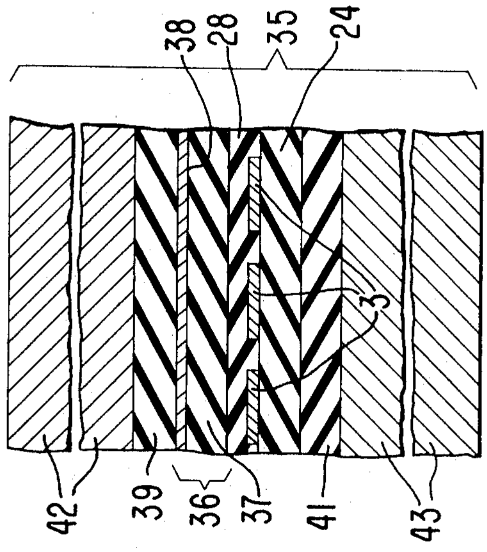
FIG. 5 is an enlarged sectional view of a portion of the structure of FIG. 2 taken along line 5—5 in the direction of the arrows.

At the writing end 23 of the array 2 of styli 3 (see FIGS. 2 and 5), the coplanar narrow end portions of the circuit boards 21 are precisely positioned in side-by-side relation by means of a coordinatograph such that the spacing between adjacent styli at the abutting margins of adjacent circuit boards 21 is the same as the spacing between adjacent styli 3 elsewhere in the array 2.

At the narrow end of the board 21, where the spacing between adjacent styli is at a minimum value, the styli 3 are covered over by a protective insulative layer 28, as of 0.002-inch-thick - thick fiberglass cloth. This assures insulation between adjacent styli 3 and allows handling of the circuit boards 21 without scratching or otherwise causing damage to the array 2.

Once the proper side-by-side positioning of the circuit boards 21 is achieved, the composite array 2, at the narrow coplanar ends, is sandwiched into a rigid sandwich writing head structure 35. The sandwich structure 35 includes a printed circuit-timing bar board 36 having an insulative substrate 37, as of 0.010-inch-thick rigid fiberglass, disposed facing the styli 3 and supporting a conductive plate 38, as of 0.0015-inch-thick copper, forming the timing electrode bar extending the entire crosswise length of the array 2. A pair of insulative slabs 39 and 41, as of 0.010-inch-thick fiberglass, are disposed on the outside of the timing bar 38 and substrate member 24, respectively, for insulating and spacing these members from a pair of conductive reinforcing plates 42 and 43, respectively, as of 0.150 to 0.200-inch-thick aluminum. Plate 42 includes a plurality of screws 44 for affixing the composite sandwich writing head structure 35 to a right angle mounting bracket, not shown, as of aluminum. Use of the conductive reinforcing plates 42 and 43, which are preferably operated at the same potential as the backup electrode 5, reduces the amount of dielectric in the writing head structure 35 which would otherwise deposit unwanted electrical charges upon the charge retentive surface of the recording paper 4. It has been found that, as the dielectric surface of the paper 4 is drawn over the writing head 35, especially at relatively high-paper transport speeds unwanted charges are deposited on the paper 4. This feature of the conductive reinforcing plates 42 and 43 in the writing head 35 forms the subject matter of and is claimed in copending U.S. Pat. Application Ser. No. 845,358 filed 7/28/69 and assigned to the same assignee as the present invention. The sandwich writing head structure 35 is bonded together as an integral rigid unit by means of epoxy adhesive positioned at the interfaces between adjacent members of the sandwich structure 35.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrostatic writing apparatus for forming a charge image on the dielectric surface of a recording medium, the combination comprising:

a plurality of elongated flexible insulative support segments having a wide end and a flat narrow end, each supporting segment having a plurality of conductive leads thereon extending from the wide end where the conductive leads are spaced from one another to the narrow end where the conductive leads are positioned close together;

a plurality of writing electrodes colinearly positioned along the edge of each supportive segment at the flat narrow end thereof and formed by the terminal portions of the plurality of conductive means;

a recording head formed by mounting the narrow ends of the plurality of supporting segments adjacent to one another coplanarly between two mounting plates establishing a colinear relationship between the writing electrodes and causing the wide end of the supporting segments to overlap;

connector means on the wide end of each of the support segments in a noncoplanar overlapping relationship;

means for moving the recording medium past the recording head in close proximity thereto; and pulsing means in electrical communication with the connector means for selectively energizing the writing electrodes to form a charge image on the recording medium as the recording medium moves past the recording head.

2. The apparatus of claim 1, wherein each of the elongated supporting segments includes a centrally disposed longitudinally directed slot extending from the wide end toward the narrow end for bifurcating the supporting segments to increase the flexibility of the supporting segments and facilitate connecting the connecting means.

3. The apparatus of claim 1, wherein the narrow end of each of the supporting segments is mounted in abutting relation ship with the adjacent narrow ends, and the last writing electrode on each narrow end is spaced the same distance from the first writing electrode on the adjacent narrow end as the remaining writing electrodes on each narrow end are spaced from one another.

* * * * *